United States Patent
Tasaki

(10) Patent No.: US 10,678,887 B2
(45) Date of Patent: *Jun. 9, 2020

(54) MONITORING DEVICE, METHOD AND COMPUTER-READABLE RECORDING MEDIUM FOR CONTROLLING MONITORING DEVICE

(71) Applicant: OMRON Corporation, Kyoto (JP)

(72) Inventor: Hiroshi Tasaki, Kyoto (JP)

(73) Assignee: OMRON Corporation, Kyoto (JP)

( * ) Notice: Subject to any disclaimer, the term of this patent is extended or adjusted under 35 U.S.C. 154(b) by 299 days.

This patent is subject to a terminal disclaimer.

(21) Appl. No.: 15/751,882

(22) PCT Filed: Dec. 6, 2016

(86) PCT No.: PCT/JP2016/086203
§ 371 (c)(1),
(2) Date: Feb. 12, 2018

(87) PCT Pub. No.: WO2017/138238
PCT Pub. Date: Aug. 17, 2017

(65) Prior Publication Data
US 2018/0232339 A1    Aug. 16, 2018

(30) Foreign Application Priority Data

Feb. 9, 2016  (JP) ................. 2016-023058

(51) Int. Cl.
*G06F 17/18* (2006.01)
*G05B 23/02* (2006.01)
*G05B 19/418* (2006.01)

(52) U.S. Cl.
CPC ....... *G06F 17/18* (2013.01); *G05B 19/41875* (2013.01); *G05B 23/0227* (2013.01);
(Continued)

(58) Field of Classification Search
CPC .... G05B 19/41875; G05B 2219/32191; G05B 23/0227; G06F 17/18; Y02P 90/22; Y02P 90/86
(Continued)

(56) References Cited

U.S. PATENT DOCUMENTS

| 6,415,276 B1 | 7/2002 | Heger et al. |
| 2007/0288795 A1 | 12/2007 | Leung et al. |
| 2012/0020521 A1* | 1/2012 | Yamagami ............... G01S 5/16 382/103 |

FOREIGN PATENT DOCUMENTS

| CN | 101014938 | 8/2007 |
| CN | 103048573 | 4/2013 |

(Continued)

OTHER PUBLICATIONS

Ryan Prescott Adams et al, "Bayesian online change point detection," arXiv preprint arXiv: 0710.3742, Oct. 19, 2007, pp. 1-7.
(Continued)

*Primary Examiner* — John H Le
(74) *Attorney, Agent, or Firm* — JCIPRNET

(57) ABSTRACT

A state change detection unit obtains the data occurrence probability based on the values of observation data and the value of a parameter of a prior distribution, obtains, based on the data generation probability, a run length probability distribution when the time-series observation data acquired up to the current time point is used as a condition, and detects a change in the state of a facility based on the run length probability distribution. An update unit updates the value of the parameter of the prior distribution using the value of the observation data, to generate the prior distribution for calculating the data occurrence probability at a next time point. In cases when the current time point is determined to be a change point in the state of the facility,
(Continued)

the state change detection unit also searches for a change indication point based on the run length probability distribution.

20 Claims, 6 Drawing Sheets

(52) U.S. Cl.
CPC ..... *G05B 2219/32191* (2013.01); *Y02P 90/22* (2015.11); *Y02P 90/86* (2015.11)

(58) Field of Classification Search
USPC ....... 702/179, 180, 181, 182, 184, 185, 188, 702/189; 382/103; 706/52; 714/26
See application file for complete search history.

(56) References Cited

FOREIGN PATENT DOCUMENTS

| CN | 105117772 | 12/2015 |
|---|---|---|
| JP | S6421509 | 1/1989 |
| JP | 2001042926 | 2/2001 |
| JP | 5530019 | 6/2014 |
| JP | 5530045 | 6/2014 |
| JP | 2015-169989 | 9/2015 |

OTHER PUBLICATIONS

Kevin P. Murphy, "Conjugate Bayesian analysis of the Gaussian distribution," def, 2007, vol. 1(2 δ 2), 16, Oct. 3, 2007, pp. 1-29.

Christopher M. Bishop, "Pattern Recognition and Machine Learning (Information Science and Statistics)," Springer-Verlag, 2006:8, pp. 1-758.

"International Search Report (Form PCT/ISA/210) of PCT/JP2016/086203", dated Feb. 7, 2017, with English translation thereof, pp. 1-4.

"Written Opinion of the International Searching Authority (Form PCT/ISA/237)" of PCT/JP2016/086203, dated Feb. 7, 2017, with English translation thereof, pp. 1-8.

"Office Action of China Counterpart Application", dated Sep. 4, 2019, with English translation thereof, p. 1-p. 11.

"Search Report of Europe Counterpart Application", dated Sep. 5, 2019, p. 1-p. 8.

Ryan Prescott Adams, et al., "Bayesian Online Changepoint Detection," ARXIV:0710.3742V1[STAT.ML], Oct. 2007, pp. 1-7.

* cited by examiner

| MONITORING TARGET | | DEFINITION OF PRIOR DISTRIBUTION | | |
|---|---|---|---|---|
| TARGET FACILITY | FAILURE MODE | PRIOR DISTRIBUTION | PARAMETERS | UPDATE FORMULA |
| MAIN MOTOR | BEARING WEAR | NORMAL DISTRIBUTION | $\mu, \sigma$ | ... |
| PUMP | ENGAGEMENT DEFECT | BETA DISTRIBUTION | $\alpha, \beta$ | ... |
| SERVOMOTOR | MISALIGNMENT | GAMMA DISTRIBUTION | $k, \theta$ | ... |
| ... | ... | ... | ... | ... |

MONITORING DEVICE, METHOD AND COMPUTER-READABLE RECORDING MEDIUM FOR CONTROLLING MONITORING DEVICE

CROSS-REFERENCE TO RELATED APPLICATION

This application is a 371 application of the international PCT application serial no. PCT/JP2016/086203, filed on Dec. 6, 2016, which claims the priority benefit of Japan application no. 2016-023058, filed on Feb. 9, 2016. The entirety of each of the above-mentioned patent applications is hereby incorporated by reference herein and made a part of this specification.

TECHNICAL FIELD

The present invention relates to a technology for monitoring a state of a facility and detecting an abnormality or an indication thereof.

BACKGROUND ART

In factories, plants, and the like, in order to operate production facilities and the like safely and normally, certain actions are necessary for preventing the occurrence of failures, accidents, and other defects in advance by constantly monitoring a state of the facility. Such actions are generally called preventive maintenance. As a system for implementing preventive maintenance, in the related art, a system configured to monitor data obtained from sensors and detect a change in the state of a facility or an indication of an abnormality has been proposed (refer to Patent Literatures 1 and 2). However, these systems of the related art have the following problems.

In the existing systems, in order to accurately ascertain a change in state or an indication of an abnormality from sensing data, it is necessary to build a model with high accuracy by learning from a large amount of data and adjusting parameters. Therefore, several months would be taken for system import before the operation starts.

In addition, there may be a time lag from when any change occurs in a state of a facility until a significant change appears in physical quantity that is monitored by a sensor. In such a case, a certain amount of time may have already elapsed after a defect occurs at a time at which an abnormality is detected in a system. Then, for example, in the case of a production facility, even if the facility is suspended at a time at which an abnormality is detected, a defective product may have already be produced and there is a need to for retroactive inspection. Moreover, since it is not possible to identify when the defect has occurred in the facility, all inspection has to be performed on a lot-by-lot basis.

Furthermore, to the existing systems require to acquire physical quantities related to various facilities as sensing data, and highly specialized knowledge is necessary to appropriately realize such sensing procedures.

CITATION LIST

Patent Literature

[Patent Literature 1]
Japanese Patent No. 5530045
[Patent Literature 2]
Japanese Patent No. 5530019

Non-Patent Literature

[Non-Patent Literature 1]
"Bayesian online change point detection," Adams, Ryan Prescott & MacKay, David J C arXiv preprint arXiv: 0710.3742, 2007
[Non-Patent Literature 2]
"Conjugate Bayesian analysis of the Gaussian distribution," Murphy, Kevin P def, 2007, Vol. 1(2σ2), 16
[Non-Patent Literature 3]
"Pattern Recognition And Machine Learning (Information Science and Statistics)," Bishop, M, Christopher springer (ed.) Springer-Verlag, 2006: 8

SUMMARY OF INVENTION

Technical Problem

The present invention has been made in view of the above circumstances, and an objective of the present invention is to provide a technology which can be easily imported and operated and through which it is possible to accurately estimate a time at which a change in a state of a facility occurred or an indication thereof started to appear.

Solution to Problem

In order to achieve the above objective, the present invention provides a monitoring device configured to monitor a state of a target facility. The monitoring device includes a data acquisition unit configured to acquire observation data on the basis of an output of a sensor provided in the target facility; a state change detection unit configured to, under the assumption that a prior distribution corresponding to a probability distribution that values of the observation data follow is preset and a run length that is a length for which the same state continues in the target facility follows a predetermined probability distribution, when observation data at a current time point is acquired by the data acquisition unit, obtain a data occurrence probability that is a conditional probability at which an observation data value at the current time point is acquired when a parameter value is set as a condition on the basis of an observation data value at the current time point and a parameter value of the prior distribution, obtain a run length probability distribution that is a distribution of a conditional probability of a run length when time-series observation data acquired up to the current time point is set as a condition on the basis of the data occurrence probability, and detect a change in the state of the target facility on the basis of the run length probability distribution; an update unit configured to update the parameter value using the observation data value at the current time point and generate a prior distribution to be used for calculating a data occurrence probability at the next time; and an information presentation unit configured to present information representing a change in the state of the target facility on the basis of a result of the state change detection unit, wherein, when it is determined that the current time point is a change point in the state of the target facility, the state change detection unit additionally searches for a change indication point that is a time at which an indication of a change in the state of the target facility started to appear on the basis of the run length probability distribution.

In such a configuration, a data, occurrence probability of observation data is obtained based on a preset prior distribution, and a change in the state of the target facility is detected based on the run length probability distribution obtained from the data occurrence probability. Therefore, it is able to start an operation (detecting a change in the state) immediately by simply providing a suitable prior distribution, and learning and parameter adjusting operations as in a system of the related art are not necessary. In addition, since parameters of the prior distribution are sequentially updated whenever observation data is acquired, it is able to ensure the accuracy at a certain level even in an initial stage in which an amount of data is small. Furthermore, even if there is a change in the trend of observation data due to a usage situation, deterioration over time, a change in an environment, or the like, since the prior distribution is modified (revised) following the change, it is able to maintain high inspection accuracy.

In addition, in the present invention, when a change in the probability of occurrence of observation data and a change in the run length probability of the state of the target facility are evaluated rather than a change in the values of the observation data value, a change in the state of the target facility is thus detected. Therefore, even if there is no significant change in the observation data value, it is able to detect a change in the state of the target facility based on the change in the run length probability. Therefore, it is able to detect a change in the state that could not be detected by the existing systems and it is able to detect a change in the state in an earlier stage (before a significant change appears in the observation data value) than the existing systems.

Further, in the present invention, not only a change point but also a change indication point are searched. When the change indication point is known, it serves as a guide regarding a time for which an operation of the target facility is checked or examined retroactively. Therefore, it is possible to efficiently perform an action when a change in the state of the target facility is detected or when an abnormality actually occurs.

When a run length value at a maximum peak of the run length probability distribution at the current time point is discontinuous with respect to a run length value at a maximum peak of the run length probability distribution at a previous time point, the state change detection unit may determine that the current time point is a change point in the state of the target facility. The run length value at the maximum peak (that is, the maximum probability) of the run length probability distribution is discontinuous because a probability of the state in the target facility being changed is high.

When it is determined that the change point is the current time point and a run length value at a maximum peak of the run length probability distribution at the current time point is not zero, the state change detection unit may determine a time preceding from the current time point by the run length value at a maximum peak of the run length probability distribution at the current time point as the change indication point. Accordingly, it is possible to easily detect a change indication point with high validity.

The information presentation unit may present change point information presenting the change point detected by the state change detection unit and/or the change indication point. When the change point and the change indication point are presented, it is able to ask the user to check the target facility before an abnormality actually occurs, and it is able to realize appropriate preventive maintenance activities.

The information presentation unit may present run length probability distribution information representing a time-series change of the run length probability distribution calculated by the state change detection unit. Further, the information presentation unit may present run length probability distribution information representing a time-series change of the run length probability distribution calculated by the state change detection unit and may present the change point information on a time axis of the run length probability distribution information. According to a time-series change of the presented run length probability distribution, since it is able to recognize appearance of a change in the state of the target facility, bases of the change point and the change indication point, and a degree of a possibility (probability), it is able to increase the reliability of the detection result.

The information presentation unit may present observation value information representing an output value of the sensor or a time-series change of the observation data value and/or run length value information representing a time-series change of a run length value at a maximum peak of the run length probability distribution on time axes that are coincident with that of the run length probability distribution information. When these information items are presented, it is able to further increase the reliability of the detection result.

The monitoring device may further include a prior distribution database in which definition information of a plurality types of prior distributions is stored; and a prior distribution setting unit configured to select a prior distribution to be used in calculation performed by the state change detection unit from the plurality of types of prior distributions. In such a configuration, since a suitable prior distribution can be selected and set according to the probability distribution that the observation data value follows, it is possible to improve detection accuracy. Here, the definition information may include information that defines a parameter of a prior distribution and an update formula of the parameter value.

The prior distribution database may store definition information of a corresponding prior distribution for each type of target facility and/or failure mode, and the prior distribution setting unit may allow a user to designate a type of the target facility to be monitored and/or the failure mode, and select a prior distribution corresponding to the target facility and/or failure mode designated by the user. Since physical quantities observed by the sensor or their behavior would be different depending on the type of target facility and the type of failure mode, a probability distribution of the values of the observation data and a suitable prior distribution would be different as well. However, it is difficult for the user to select the suitable prior distribution since understanding on characteristics of the target facility and the sensor as well as professional knowledge in statistics are necessary. Therefore, since an interface through which an appropriate prior distribution is set by simply designating the type of target facility and the type of failure mode is provided in the present invention, it is able to enhance the convenience for the user and it is possible for those without highly specialized knowledge to easily set an appropriate prior distribution.

Here, the present invention can be regarded as a monitoring device having the above configuration and at least some of the functions. In addition, the present invention can be regarded as a monitoring system including a sensor and a monitoring device. In addition, the present invention can be regarded as a method for controlling a monitoring device including at least some of the above processes, a program causing a computer to perform such a method, or a computer-readable recording medium in which such a program is recorded non-temporarily. Absent technical contradiction, the above configurations and processes can be combined to constitute the present invention.

Advantageous Effects of Invention

According to the present invention, it is able to provide a monitoring device which can be easily imported and operated and through which it is possible to accurately estimate a time at which a change in a state of a facility occurred or an indication thereof started to appear.

BRIEF DESCRIPTION OF DRAWINGS

FIG. 3 is a diagram showing an example of prior distribution definition information.

DESCRIPTION OF EMBODIMENTS

Exemplary embodiments of the present invention will be described below with reference to the drawings. However, it should be noted that configurations described below can be appropriately changed according to configurations and various conditions of a system to which the invention is applied, and there is no intention to limit the scope of the invention to the following description.

<Configuration of Monitoring System>

A monitoring system according to an embodiment of the present invention is a system configured to constantly monitor a state of a target facility based on a signal obtained from a sensor installed at a target facility and detect a change in the state. The monitoring system is used to support state monitoring and preventive maintenance of various facilities in factories and plants.

Figure 1:
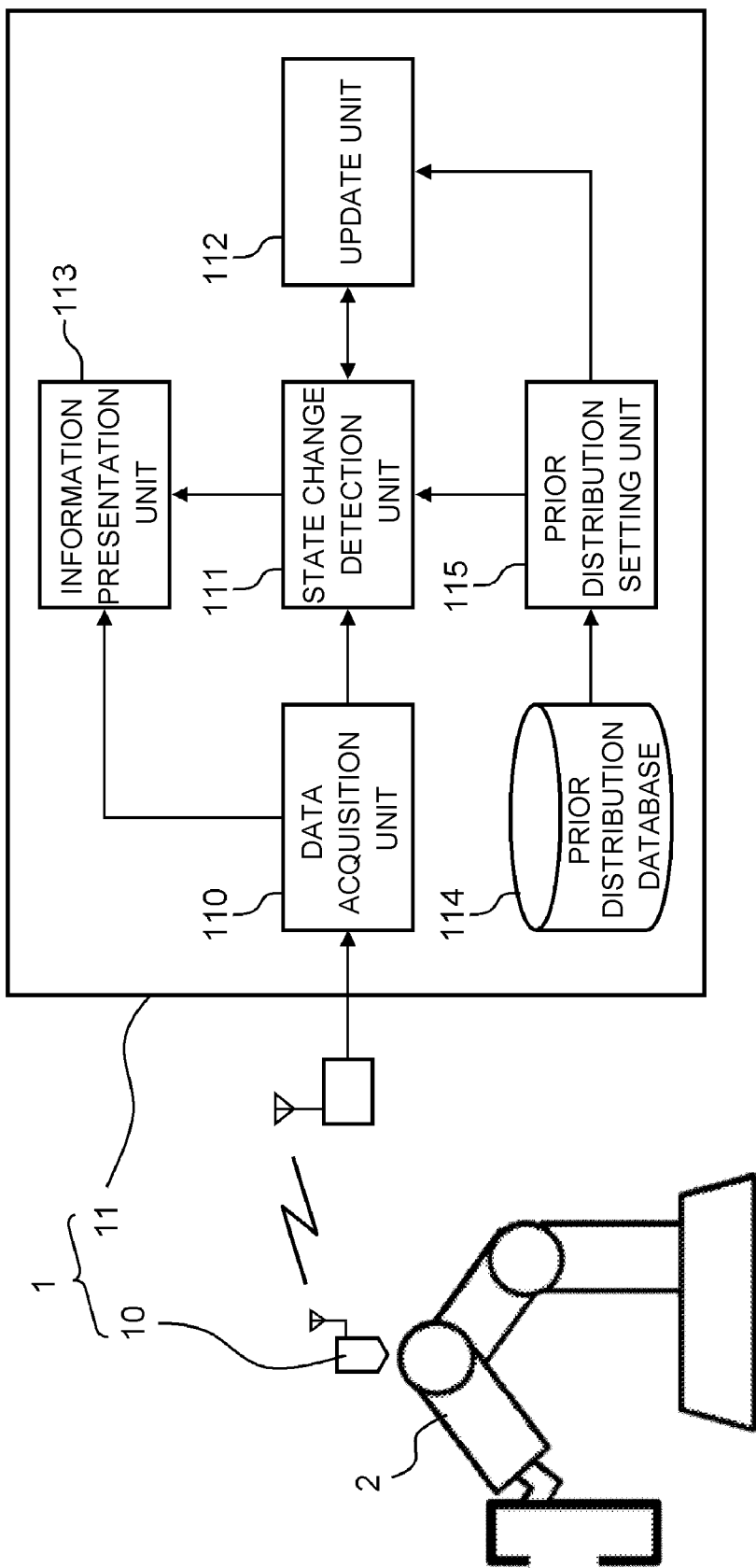
FIG. 1 is a diagram showing a configuration of a monitoring system.

FIG. 1 is a diagram schematically showing a configuration of a monitoring system according to an embodiment of the present invention. A monitoring system 1 includes a sensor 10 provided in a facility 2 to be monitored (referred to as a target facility 2) and a monitoring device 11 configured to monitor a state of the target facility 2. The sensor 10 and the monitoring device 11 are wired or wirelessly connected. FIG. 1 shows an example in which data is exchanged between a wireless module included in the sensor 10 and a wireless module included in the monitoring device 11 using 920 MHz band communication.

The sensor 10 is a measurement unit configured to measure physical quantities of the target facility 2. The sensor 10 may be a sensor that is originally provided in the target facility 2 or a sensor that is added to the target facility 2. The type of the sensor 10 and the physical quantities measured by the sensor 10 may be arbitrary and may be appropriately designed according to the type of the target facility 2, a failure mode, and the like. For example, a vibration sensor configured to measure vibration, a temperature sensor configured to measure temperature, a current sensor configured to measure currents, a voltage sensor configured to measure voltages, a sound sensor configured to measure sound, an image sensor configured to measure color or brightness, a speed sensor configured to measure speed, and an acceleration sensor configured to measure acceleration can be exemplified. The number of sensors 10 may be one or more. In addition, multiple types of sensors 10 may be used. The sensor 10 performs measurement for every predetermined period and outputs sensing data. The sensing data output from the sensor 10 is obtained by the monitoring device 11.

The monitoring device 11 is a device configured to monitor a state of the target facility 2 based on the sensing data that is sequentially obtained from the sensor 10. The monitoring device 11 can be composed of, for example, a general-purpose computer that includes a central processing unit (CPU) as a hardware processor, a memory, an auxiliary storage device (such as a hard disk or a semiconductor disk), an input device (such as a keyboard, a pointing device, or a touch panel), a display device, and a communication I/F. However, the configuration of the monitoring device 11 is not limited thereto. For example, the monitoring device 11 may be constituted by a plurality of computers, or the monitoring device 11 may be constituted by a dedicated device such as an embedded computer or a circuit such as an application specific integrated circuit (ASIC) or a field-programmable gate array (FPGA).

As shown in FIG. 1, the monitoring device 11 includes a data acquisition unit 110, a state change detection unit 111, an update unit 112, an information presentation unit 113, a prior distribution database 114, and a prior distribution setting unit 115 as functions thereof. These functions are executed when a CPU reads and executes a program stored in the memory or the auxiliary storage device. Here, some of these functions (for example, functions of the state change detection unit 111 and the update unit 112) may be executed in another server on a network using a client and server or cloud computing technology.

The data acquisition unit 110 has a function of acquiring observation data on the basis of an output of the sensor 10. The state change detection unit 111 has a function of detecting a change in the state of the target facility 2 based on time-series observation data. The update unit 112 has a function of updating parameters of a state estimation model used in the state change detection unit 111 using values of the acquired observation data. The information presentation unit 113 has a function of presenting information indicating a change in the state of the target facility 2 on the basis of the result of the state change detection unit 111 on a display device. The prior distribution database 114 is a database in which definition information of a plurality of types of prior distributions is stored. The prior distribution setting unit 115 has a function of selecting a prior distribution used in calculation of the state change detection unit 111 from among a plurality of types of prior distributions registered in the prior distribution database 114. These functions will be described below in detail.

<State Estimation Algorithm>

First, a state estimation algorithm used by the state change detection unit 111 of the monitoring device 11 will be described. The state estimation algorithm of the present embodiment is based on a change point detection algorithm (refer to Non-Patent Literature 1) according to the Bayesian estimation proposed by Adams et al., and an improvement to be applied in monitoring a state of a facility is added thereto. Advantages of the Bayesian estimation are as follows. It is able to ensure a certain level of estimation accuracy even in an initial observation stage in which an amount of data is small. It is not easily influenced by noise because the obtained data, a state of the device, a change point, and the like are processed according to probabilities. Since it is easy to extend to distributed processing, it is easy to apply to a large scale system and to realize massive data processing. It is easy to redo estimation of a state retroactively or evaluation and determination of change point detection because a time-series change of probability distribution is preserved.

Figure 2:
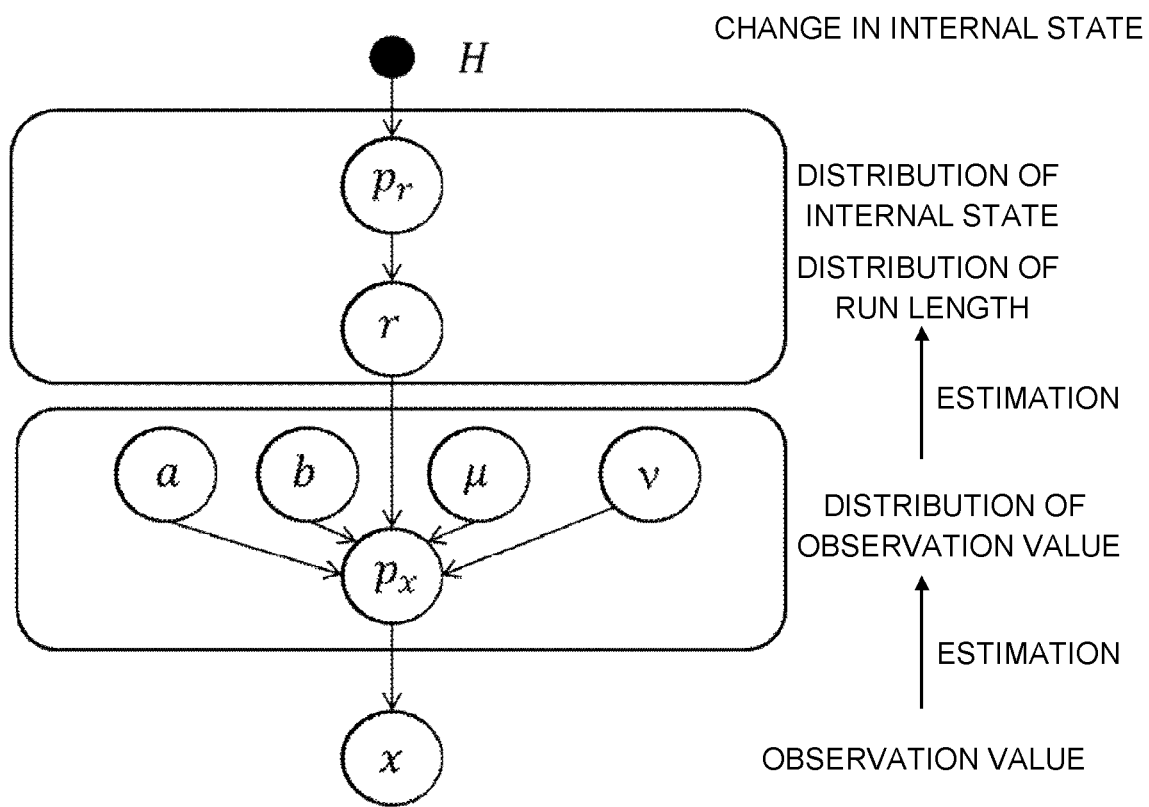
FIG. 2 is a diagram showing a state estimation model and relationships between variables.

The state estimation algorithm of the monitoring device 11 is provided to ascertain a change in an internal state of the target facility 2. Here, as a hypothesis, assume that there are two factors in a change in an observation data value obtained from the target facility 2 which are a change due to parameters of the probability distribution and a change due to a change in the internal state of the target facility 2. In addition, in order to model continuity of the internal state of the target facility 2, a length in which the same state continues in the target facility 2 is set as a random variable and this is referred to as a run length. Such hypothesis is shown in FIG. 2. When a change (H) occurs in the internal state of the target facility 2, a probability (pr) of the run length changes and influences a run length (r) of the target facility 2. Thus, when there is a change in the run length (r) and parameters (a, b, μ, and ν) of a probability distribution (px) of observation data, a probability of occurrence (px) of observation data changes. As a result, a value of observation data (x) would accordingly change. Based on such a model, the probability of occurrence (px) is estimated from the obtained observation data (x), and additionally a rum length probability (pr) in an internal state is estimated from the probability of occurrence (px) of observation data, which is a fundamental concept of the state estimation algorithm of the present embodiment.

Next, a specific example of the state estimation algorithm will be described in detail. In the following description, a variable A at a time t will be denoted by $A_t$, time-series data of a variable A in a period of times 1 to t will be denoted by $A_{1:t}$, and a variable A corresponding to a value r of a run length will be denoted by $A^{(r)}$.

A run length $r_t$ is a variable that increases by one as the state continues. For example, when there is no change in the state from the time 1 to t, $r_t=t$ is established. On the other hand, when there is a change in the state at a time t+1, it is reset to $r_{t+1}=0$. Then, when the state continues, it is increased by one again as in $r_{t+2}=1$, $r_{t+3}=2$, . . . .

Here, an assumption that a determination of whether the state of the target facility 2 continues or changes, that is, whether the run length $r_t$ increases or becomes zero, follows a predetermined probability distribution is given. In the present embodiment, a probability of the state of the target facility 2 continuing (continuation probability) is defined according to the following formula using a conditional probability for a run length $r_{t-1}$ at a previous time point (t−1).

[Formula 1]

$$P(r_t \mid r_{t-1}) = \begin{cases} H(r_{t-1}) & \text{if } r_t = 0 \\ 1 - H(r_{t-1}) & \text{if } r_t = r_{t-1} + 1 \\ 0 & \text{otherwise} \end{cases} \quad (1)$$

H(τ) is a hazard function and represents a probability of occurrence of a change in the internal state of the target facility 2, and corresponds to a hypothesis that a change point occurs whenever the same state continues a certain number of times on average. In the present embodiment, for simplicity, the hazard function is set as H(τ)=1/n (n is a constant and means an average number of times that the same state continues).

In problem setting, it is determined whether there is a change point in observation data $x_1$ at a current time point t under a situation in which time-series observation data $x_{1:t}$ is obtained in a period of times 1 to t. Therefore, based on the Bayes' formula, a conditional probability of the run length $r_t$ when time-series observation data $x_{1:t}$ acquired up to the current time point t is set as a condition is formulated as follows.

[Formula 2]

$$P(r_t \mid x_{1:t}) = \frac{P(r_t, x_{1:t})}{P(x_{1:t})} \quad (2)$$

In Formula (2), the numerator part on the right-hand side can be recursively expanded as the following formula.

[Formula 3]

$$P(r_t, x_{1:t}) = \sum_{r_{t-1}} P(r_t \mid r_{t-1}) P(x_t \mid r_{t-1}, x_t^{(r)}) P(r_{t-1}, x_{1:t-1}) \quad (3)$$

In Formula (3), the second term $P(x_t|r_{t-1}, x_t^{(r)})$ on the right-hand side denotes a probability of occurrence (corresponding to px in FIG. 2) of observation data $x_t$ and is also known as a likelihood. Here, when a value of observation data x is assumed to follow a normal distribution, if a conjugate distribution of the normal distribution is set as a prior distribution, the second term $P(x_t|r_{t-1}, x_t^{(r)})$ on the right-hand side in Formula (3) can be rewritten as the following formula using parameters of the prior distribution.

[Formula 4]

$$P(x_t \mid \mu_t^{(r)}, \lambda_t^{(r)}, \nu_t^{(r)}) = \frac{\Gamma\left(\frac{\nu_t^{(r)}}{2} + \frac{1}{2}\right)}{\Gamma\left(\frac{\nu_t^{(r)}}{2}\right)} \left\{\frac{\lambda_t^{(r)}}{\pi \nu_t^{(r)}}\right\}^{\frac{1}{2}} \left\{1 + \frac{\lambda_t^{(r)}(x_t - \mu_t^{(r)})^2}{\nu_t^{(r)}}\right\}^{-\frac{\nu_t^{(r)}}{2} - \frac{1}{2}} \quad (4)$$

In the condition part on the left-hand side, μ and λ are parameters that are estimated based on the observation data x, and ν is a parameter indicating a degree of freedom of a run length (maximum run length value). Here, given that ν=2a and λ=a/b, Formula (4) may be rearranged as follows.

[Formula 5]

$$P(x_t \mid \mu_t^{(r)}, \nu_t^{(r)}, a_t^{(r)}, b_t^{(r)}) = \frac{\Gamma\left(a_t^{(r)} + \frac{1}{2}\right)}{\Gamma(a_t^{(r)})} \left\{\frac{1}{2\pi b_t^{(r)}}\right\}^{\frac{1}{2}} \left\{1 + \frac{(x_t - \mu_t^{(r)})^2}{2 b_t^{(r)}}\right\}^{-a_t^{(r)} - \frac{1}{2}} \quad (5)$$

Since the run length $r_t$ at the time t has a value of 0 to t, the probability of occurrence of observation data $x_t$ in Formula (5) can be calculated for each case of r=0, 1, . . . , t. For r=0, 1, . . . , t, when a data occurrence probability obtained from Formula (5), a continuation probability obtained from Formula (1), and a calculation result in Formula (3) at the time t−1 are plugged into Formula (3), probabilities $P(r_t=0, x_{1:t})$, $P(r_t=1, x_{1:t})$, . . . , $P(r_t=t, x_{1:t})$ for each length of the run length are obtained, and these values are plugged into Formula (2), a run length probability distribution $P(r_t|x_{1:t})$ for the time-series observation data $x_{1:t}$ is obtained. A length of the run length at the time t can be estimated from a maximum peak of the run length probability distribution $P(r_t|x_{1:t})$. In addition, it is able to determine whether the state continues or is changed based on whether a maximum peak of the run length probability distribution is continuous or discontinuous between the time t−1 and the time t.

Furthermore, according to the Bayesian update, the prior distribution is updated using the value of observation data $x_t$ obtained this time. In the above-described prior distribution $P(\mu, \nu, a, b)$, parameters may be updated according to the following formula. Here, initial values are used for parameters $\mu^{(0)}$, $\nu^{(0)}$, $a^{(0)}$, and $b^{(0)}$ at r=0.

[Formula 6]

$$\mu_{t+1}^{(r+1)} = \frac{\nu_t^{(r)} \mu_t^{(r)} + x_t}{\nu_t^{(r)} + 1} \quad (6)$$

$$\nu_{t+1}^{(r+1)} = \nu_t^{(r)} + 1$$

$$a_{t+1}^{(r+1)} = a_t^{(r)} + \frac{1}{2}$$

$$b_{t+1}^{(r+1)} = b_t^{(r)} + \frac{\nu_t^{(r)}}{\nu_t^{(r)} + \mu_t^{(r)}}$$

In calculating a probability of occurrence when the next (t+1) observation data $x_{t+1}$ is obtained, when the updated parameters $\mu_{t+1}$, $\nu_{t+1}$, $a_{t+1}$, and $b_{t+1}$ are used, it is able to obtain a reasonable probability of occurrence in which the trend of data $x_{1:t}$ observed so far is reflected. Therefore, it is able to improve the accuracy of state estimation.

The state estimation algorithm of the present embodiment is described above. Here, the above-described continuation probability (Formula (1)), the hazard function $H(\tau)$, the probability distribution that observation data follows, the prior distribution and parameters thereof, and the update formula of parameters are examples. These may be appropriately selected according to the type, failure mode, and the like of the target facility 2. For example, when observation data follows a binomial distribution, a beta distribution which is a conjugate distribution thereof may be set as a prior distribution, and when observation data follows a Poisson distribution, a gamma distribution which is a conjugate distribution thereof may be set as a prior distribution. As parameters of the prior distribution and an update formula thereof, those disclosed in Non-Patent Literature 2 and Non-Patent Literature 3 can be used, and detailed descriptions will be omitted.

<Installation of Monitoring System>

Procedures and operations when the monitoring system 1 is installed in the target facility 2 will be described.

(1) Installation of Sensor 10

First, a user selects an appropriate sensor 10 according to the type or failure mode of the target facility 2. For example, when "a main motor of a machining tool" is a monitored target, "bearing wear" would be a main failure mode. When vibration is generated due to bearing wear, a load of the motor and a current would increase. Therefore, when the sensor 10 configured to measure a current of a motor is installed, it is able to detect an abnormality of the main motor due to the bearing wear. In addition, when "a pump such as a press device" is a monitored target, an "engagement defect" is a main failure mode. When an engagement defect occurs due to a foreign substance or the like, a load of a pump and a current would increase. Therefore, when the sensor 10 configured to measure a current of a pump is installed, it is able to detect an abnormality of the pump due to the engagement defect. In addition, when "a servomotor such as a robot" is a monitored target, "misalignment" is a main failure mode. When a load situation of the motor changes due to the misalignment, a power factor would also change. Therefore, when the sensor 10 configured to measure a power factor of a servomotor is installed, it is able to detect an abnormality of the servomotor due to the misalignment.

The sensor 10 that is retrofitted to the target facility 2 is preferable. This is because it is easy to introduce the monitoring system 1 to the existing target facility 2. It is needless to say that, when there is a sensor that is provided in advance in the target facility 2, the sensor may be used.

(2) Setting of Prior Distribution

Next, the user sets a prior distribution used in state estimation and an update formula of parameters according to the type or failure mode of the target facility 2. While the user can set any prior distribution and update formula for the monitoring device 11, he or she also can select a prior distribution to be used from a plurality types of prior distributions that are registered in the prior distribution database 114 in advance through a user interface that is provided by the prior distribution setting unit 115.

FIG. 3 schematically shows an example of definition information of a prior distribution registered in the prior distribution database 114. In this example, definition information of a corresponding prior distribution is registered for each type of the target facility and the failure mode. The definition information of the prior distribution includes information that defines a type of the prior distribution, parameters of the prior distribution, an update formula of parameter values (for example, Formula (6)), and the like. Here, the structure of the definition information is not limited thereto. For example, for each type of the target facility or each type of the failure mode, or each type of the sensor or each physical quantity to be measured, definition information of a corresponding prior distribution may be registered. In addition, the definition information may include a type of the probability distribution of observation data, a prediction logic (for example, Formula (5)) for obtaining a data occurrence probability from a parameter value and an observation data value, an initial value of a parameter, a hazard function, and the like.

Figure 4:
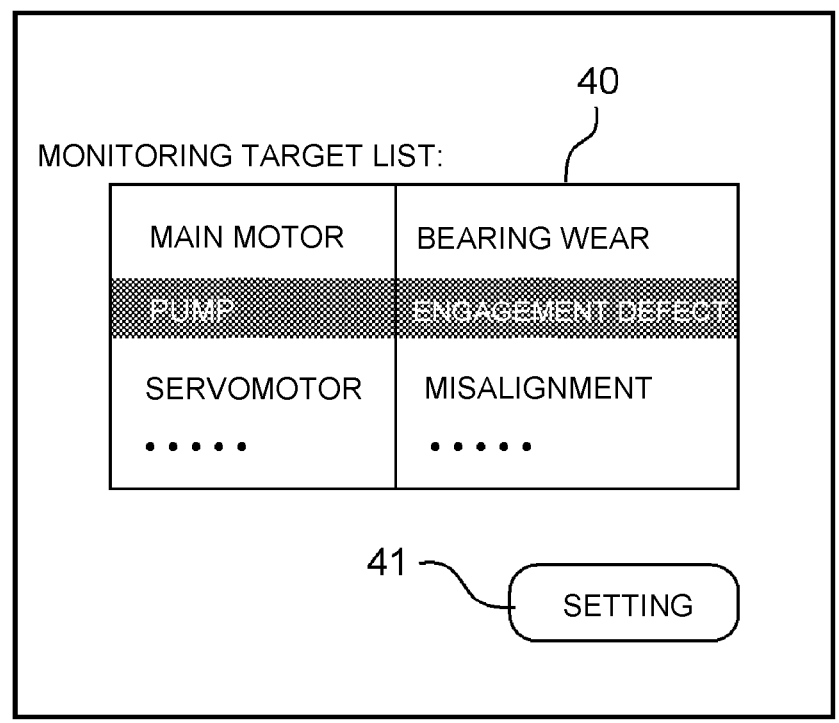
FIG. 4 is a diagram showing an example of a user interface of prior distribution setting.

When the user operates the monitoring device 11 and calls a function of the prior distribution setting unit 115, a user interface as illustrated in FIG. 4 would be displayed. When the user designates a target facility to be monitored from a monitoring target list 40 and a type of the failure mode and presses a setting button 41, the prior distribution setting unit 115 reads definition information of a prior distribution corresponding to the designated target facility and failure mode from the prior distribution database 114, sets parameters of the prior distribution in the state change detection unit 111, and sets an update formula of parameters in the update unit 112. In addition, the prior distribution setting unit 115 may set a prediction logic corresponding to the selected prior distribution in the state change detection unit 111 based on requirements.

<Operation of Monitoring System>

Figure 5:
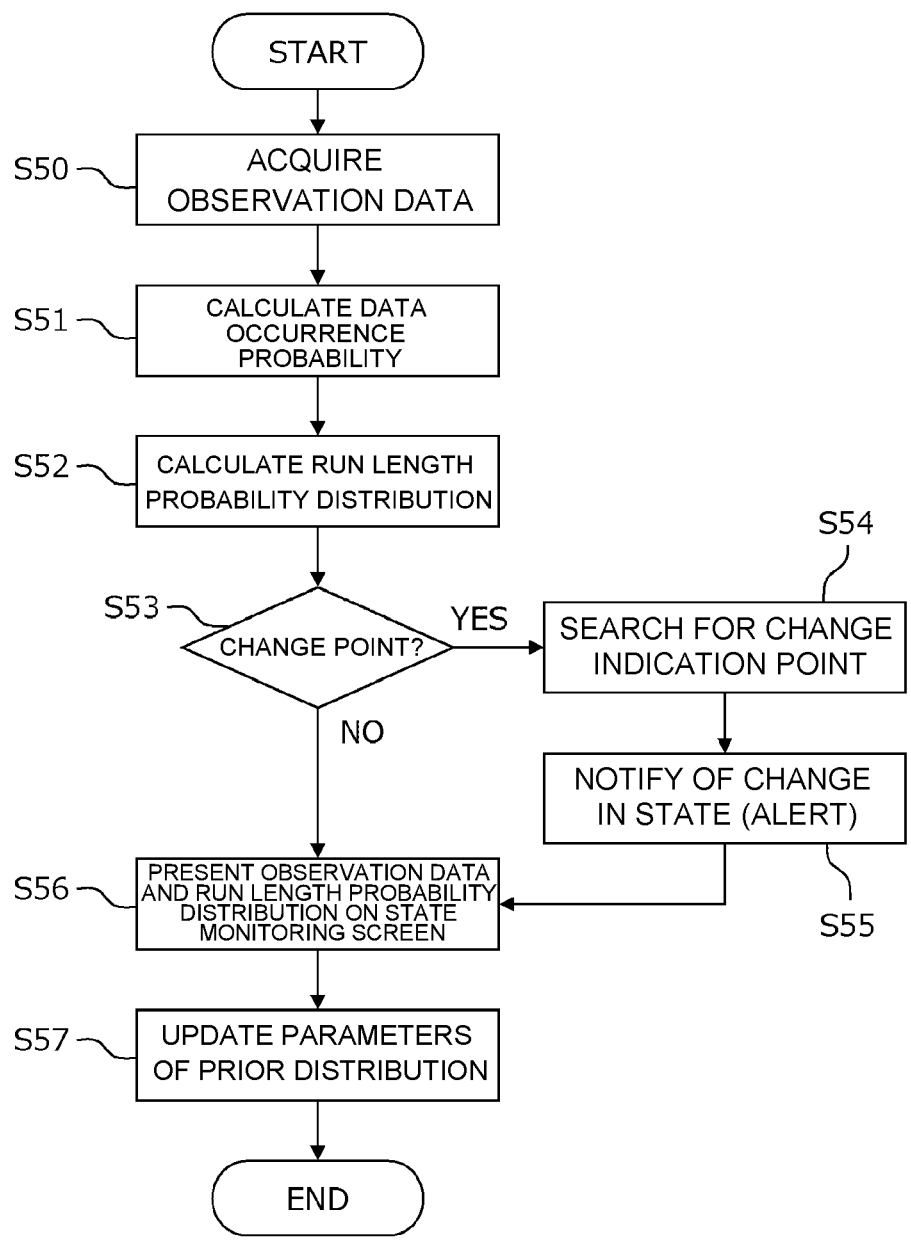
FIG. 5 is a flowchart of a state monitoring process.

A state monitoring process of the monitoring system 1 will be described with reference to a flowchart of FIG. 5.

In Step S50, the data acquisition unit 110 performs necessary preprocessing on sensing data input from the sensor 10 and acquires observation data $x_t$ representing a state of the target facility 2. The preprocessing includes, for example, data segmenting (trimming) in a necessary range, resampling, filtering processing, averaging, and frequency conversion. The data acquisition unit 110 may acquire, for example, one piece of observation data for each tact time of the target facility 2.

In Step S51, the state change detection unit 111 reads parameters $\mu_t$, $v_t$, $a_t$, and $b_t$ of the prior distribution stored in the memory, and calculates a data occurrence probability $P(x_t|\mu_t, v_t, a_t, b_t)$ according to Formula (5) based on these parameters and the observation data $x_t$.

In Step S52, the state change detection unit 111 reads a calculation result of Formula (3) at the time t−1 stored in the memory and calculates a run length probability distribution $P(r_t|x_{1:t})$ according to Formula (1) to Formula (3) based on the data occurrence probability $P(x_t|\mu_t, v_t, a_t, b_t)$.

In Step S53, the state change detection unit 111 determines whether the current time point t is a change point on the basis of the run length probability distribution $P(r_t|x_{1:t})$. When there is no change in the state of the target facility 2, the run length $r_t$ has a value that is greater by one than the run length $r_{t-1}$ of the previous time point t−1. Therefore, the state change detection unit 111 compares a run length value $rmax_t$ at a maximum peak of a run length probability distribution $P(r_t|x_{1:t})$ at the current time point t with a run length value $rmax_{t-1}$ at a maximum peak of a run length probability distribution $P(r_{t-1}|x_{1:t-1})$ at the time point t−1, and when $rmax_t$ is discontinuous with respect to $rmax_{t-1}$ ($rmax_t \neq rmax_{t-1}+1$), determines the current time point t as a change point. On the other hand, when $rmax_t$ is continuous with respect to $rmax_{t-1}$ ($rmax_t = rmax_{t-1}+1$), it is determined that the current time point t is not a change point.

Here, when it is determined that the current time point t is a change point (YES in Step S53), if the run length value $rmax_t$ at a maximum peak is zero, a probability of the current time point t being a change point is high. However, when the run length value $rmax_t$ is not zero, since there is a possibility of the state being continuous from a certain time in the past, there is a possibility of an indication of a change in the state of the target facility 2 appearing before the current time point t. Therefore, the state change detection unit 111 searches for a time (referred to as a change indication point) at which an indication of a change in the state started to appear on the basis of the run length probability distribution (Step S54). When the change indication point is known, it serves as a guide regarding a time for which an operation of the target facility 2 is checked or examined retroactively, and it is possible to efficiently perform an action when a change in the state of the target facility 2 is detected or when an abnormality actually occurs. In the present embodiment, simply, a time (t−$rmax_t$) that precedes from the current time point t by the run length value $rmax_t$ is determined as a change indication point. According to this method, it is possible to simply detect a change indication point with high validity. Then, the state change detection unit 111 notifies with an alert when there is a change in the state (Step S55).

In Step S56, the information presentation unit 113 presents information about the observation data $x_t$ obtained in Step S50, the run length probability distribution $P(r_t|x_{1:t})$ obtained in Step S52, the determination result in Step S53, the change point and the change indication point detected in Steps S53 and S54, and the like on a state monitoring screen.

Figure 6:
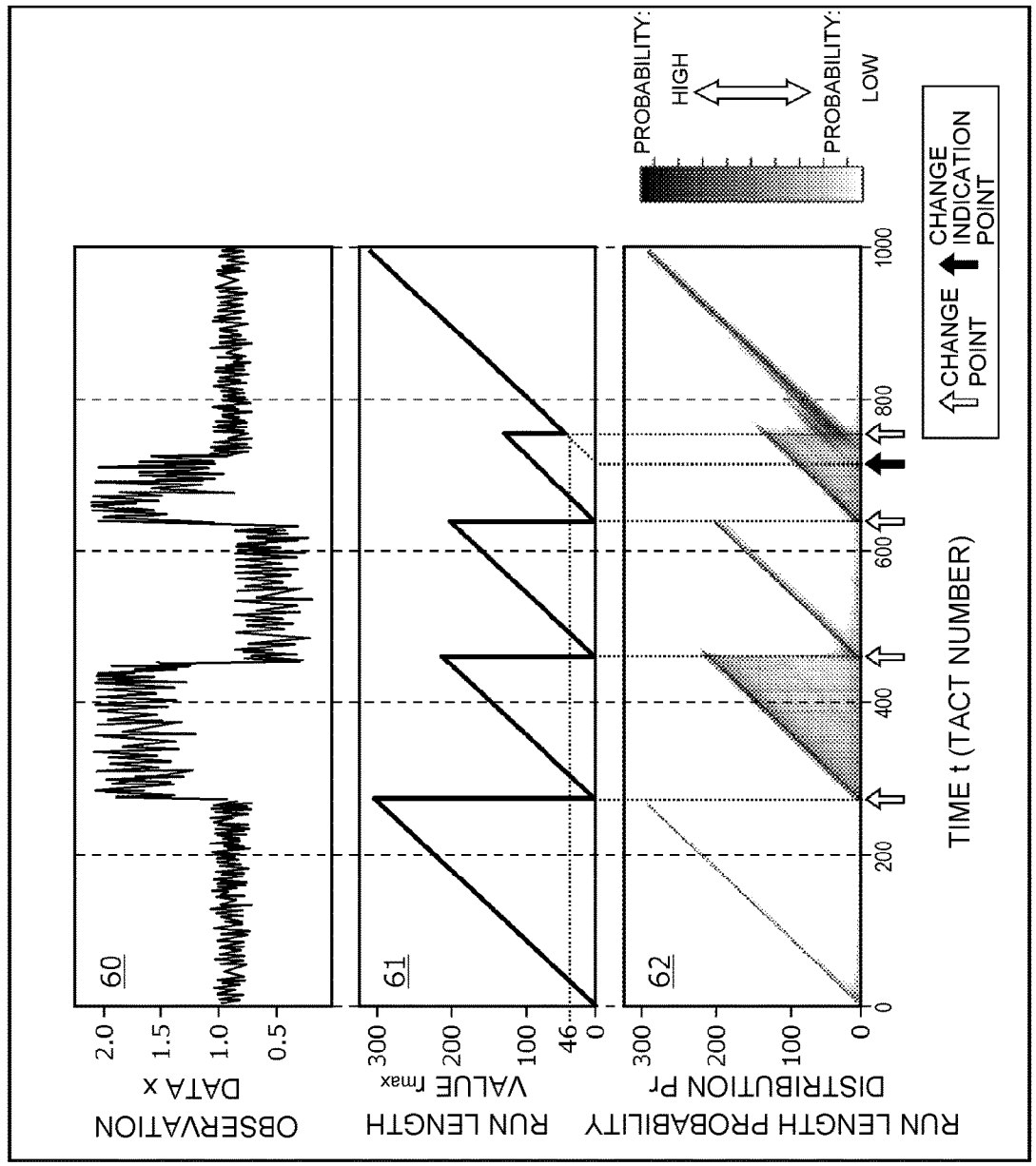
FIG. 6 is a diagram showing an example of a state monitoring screen.

FIG. 6 is an example of the state monitoring screen displayed on the display device. Observation value information 60 representing a time-series change of the observation data $x_t$, run length value information 61 representing a time-series change of the run length value $rmax_t$ at a maximum peak of the run length probability distribution, and run length probability distribution information 62 representing a time-series change of the run length probability distribution $P(r_t|x_{1:t})$ are presented on the time axes that are coincident with each other. The horizontal axis is a time axis (tact number), and the vertical axis of the observation value information 60 represents observation data values, and the vertical axes of the run length value information 61 and the run length probability distribution information 62 represent run length values. In the run length probability distribution information 62, a magnitude of a probability is represented by a density of a line, and the darkest part represents a maximum peak of the run length probability distribution. Further, in the state monitoring screen, change point information (positions of a change point and a change indication point) is shown on the time axis of the run length probability distribution information. In this example, it is shown that a change point (white arrow) is detected at four time points, t=272, 460, 635, and 758. In addition, at a change point of t=758, since the run length value $rmax_t$ is not zero, a time point t−$rmax_t$=758−46=712 is regarded as a change indication point, and the change indication point is indicated by a black arrow. In such a display, it can be understood that, when an operation of the target facility 2 is verified or examined, it is sufficient to check retroactively to the tact number t=712.

In Step S57, the update unit 112 updates parameters of Formula (6) using the value of observation data $x_t$ and parameters of the prior distribution of the current time point t. The updated parameters of the prior distribution are stored in the memory in order to be used for calculating the next time point t+1.

When Steps S50 to S57 are performed for each tact, it is able to monitor the state of the target facility 2 in real time and it is possible to immediately detect a change in the state.

<Advantages of Monitoring System>

According to the monitoring system 1 of the present embodiment, a data occurrence probability of observation data is obtained based on a preset prior distribution, and a change in the state of the target facility is detected based on the run length probability distribution obtained from the data occurrence probability. Therefore, it is able to start an operation (detecting a change in the state) immediately by simply providing a suitable prior distribution, and learning and parameter adjusting operations as in a system of the related art are not necessary. In addition, since parameters of the prior distribution are sequentially updated whenever observation data is acquired, it is able to ensure accuracy with a certain level in an initial stage in which an amount of data is small. Furthermore, even if there is a change in the trend of observation data due to a usage situation, deterioration over time, a change in an environment, or the like, since the prior distribution is modified (revised) following the change, it is possible to maintain high detection accuracy.

In addition, in the state estimation algorithm of the present embodiment, when a change in the probability of occurrence of observation data and a change in the run length probability of the state of the target facility are evaluated rather than a change in the observation data value itself, a change in the state of the target facility is detected. Therefore, even if there is no significant change in the observation data value, it is able to detect a change in the state of the target facility based on the change in the run length probability. Therefore, it is able to detect a change in the state that could not be detected in a system of the related art and it is possible to detect a change in the state in an earlier stage (before a significant change appears in the observation data value) than in a system of the related art.

In addition, when the user views a time-series change of the run length probability distribution presented on the state monitoring screen, since it is able to recognize appearance of a change in the state of the target facility, bases of the change point and the change indication point, and a degree of a possibility (probability), it is able to increase the reliability of the detection result. In addition, when the change point and the change indication point are presented, it is possible to ask the user to check the target facility before an abnormality actually occurs, it is possible to realize appropriate preventive maintenance activities. In particular, when the change indication point is known, it may serve as a guide regarding a time for which an operation of the target facility is checked or examined retroactively. Therefore, it is able to efficiently perform an action when a change in the state of the target facility is detected or when an abnormality actually occurs.

In addition, since a suitable prior distribution can be selected and set according to the probability distribution that the observation data value follows using the prior distribution setting unit, it is possible to improve detection accuracy. In addition, since an interface through which an appropriate prior distribution is set by simply designating the type of target facility and the type of failure mode is provided, it is possible to improve convenience for the user and it is possible for those without highly specialized knowledge to easily set an appropriate prior distribution.

Here, the configuration of the embodiment described above is only a specific example of the present invention and is not intended to limit the scope of the present invention. The present invention can adopt various specific configurations without departing from the technical scope. For example, the system configuration, the data structure, the user interface, the formulae, the parameters, and the like shown in the above embodiment are examples, and can be appropriately changed according to the configuration of the target facility or the monitoring device.

The invention claimed is:

1. A monitoring device configured to monitor a state of a target facility, the monitoring device comprising:
a data acquisition unit, configured to acquire observation data on the basis of an output of a sensor provided in the target facility;
a state change detection unit, configured to, under an assumption that a prior distribution corresponding to a probability distribution that values of the observation data follow is preset and a run length that is a length for which the same state continues in the target facility follows a predetermined probability distribution, when observation data at a current time point is acquired by the data acquisition unit, obtain a data occurrence probability that is a conditional probability at which an observation data value at the current time point is acquired when a parameter value is set as a condition on the basis of the observation data value at the current time point and a parameter value of the prior distribution, obtain a run length probability distribution that is a distribution of a conditional probability of a run length when time-series observation data acquired up to the current time point is set as a condition on the basis of the data occurrence probability, and detect a change in the state of the target facility on the basis of the run length probability distribution;
an update unit, configured to update the parameter value using the observation data value at the current time point and generate a prior distribution to be used for calculating a data occurrence probability a next time point; and
an information presentation unit, configured to present information representing the change in the state of the target facility on the basis of a result of the state change detection unit,
wherein, when it is determined that the current time point is a change point in the state of the target facility, the state change detection unit additionally searches for a change indication point that is a time at which an indication of the change in the state of the target facility first appeared on the basis of the run length probability distribution.

2. The monitoring device according to claim 1,
wherein, when a run length value at a maximum peak of the run length probability distribution at the current time point is discontinuous with respect to a run length value at a maximum peak of the run length probability distribution at a previous time point, the state change detection unit determines that the current time point is the change point in the state of the target facility.

3. The monitoring device according to claim 2,
wherein, when it is determined that the current time point is the change point and a run length value at a maximum peak of the run length probability distribution at the current time point is not zero, the state change detection unit determines a time preceding the current time point by the run length value at a maximum peak of the run length probability distribution at the current time point as the change indication point.

4. The monitoring device according to claim 2,
wherein the information presentation unit presents change point information representing the change point detected by the state change detection unit and/or the change indication point.

5. The monitoring device according to claim 2,
wherein the information presentation unit presents run length probability distribution information representing a time-series change of the run length probability distribution calculated by the state change detection unit.

6. The monitoring device according to claim 1,
wherein, when it is determined that the current time point is the change point and a run length value at a maximum peak of the run length probability distribution at the current time point is not zero, the state change detection unit determines a time preceding the current time point by the run length value at a maximum peak of the run length probability distribution at the current time point as the change indication point.

7. The monitoring device according to claim 6,
wherein the information presentation unit presents change point information representing the change point detected by the state change detection unit and/or the change indication point.

8. The monitoring device according to claim 6,
wherein the information presentation unit presents run length probability distribution information representing a time-series change of the run length probability distribution calculated by the state change detection unit.

9. The monitoring device according to claim 1,
wherein the information presentation unit presents change point information representing the change point detected by the state change detection unit and/or the change indication point.

10. The monitoring device according to claim 9,
wherein the information presentation unit presents run length probability distribution information representing a time-series change of the run length probability distribution calculated by the state change detection unit.

11. The monitoring device according to claim 1,
wherein the information presentation unit presents run length probability distribution information representing a time-series change of the run length probability distribution calculated by the state change detection unit.

12. The monitoring device according to claim 11,
wherein the information presentation unit presents the change point information on a time axis of the run length probability distribution information.

13. The monitoring device according to claim 12,
wherein the information presentation unit presents observation value information representing an output value of the sensor or a time-series change of the observation data value and/or run length value information representing a time-series change of a run length value at a maximum peak of the run length probability distribution on time axes that are coincident with that of the run length probability distribution information.

14. The monitoring device according to claim 11,
wherein the information presentation unit presents observation value information representing an output value of the sensor or a time-series change of the observation data value and/or run length value information representing a time-series change of a run length value at a maximum peak of the run length probability distribution on time axes that are coincident with that of the run length probability distribution information.

15. The monitoring device according to claim 1 further comprising:
a prior distribution database, configured to store definition information of a plurality types of prior distributions; and
a prior distribution setting unit, configured to select a prior distribution, from the plurality types of prior distributions, to be used in calculation performed by the state change detection unit.

16. The monitoring device according to claim 15,
wherein the definition information comprises information that defines a parameter of a prior distribution and an update formula of the parameter value.

17. The monitoring device according to claim 16,
wherein the prior distribution database stores definition information of a corresponding prior distribution for each type of target facility and/or failure mode, and
wherein the prior distribution setting unit allows a user to designate a type of target facility to be monitored and/or failure mode, and selects a prior distribution corresponding to the target facility and/or the failure mode designated by the user.

18. The monitoring device according to claim 15,
wherein the prior distribution database stores definition information of a corresponding prior distribution for each type of target facility and/or failure mode, and
wherein the prior distribution setting unit allows a user to designate a type of target facility to be monitored and/or failure mode, and selects a prior distribution corresponding to the target facility and/or the failure mode designated by the user.

19. A method for controlling a monitoring device configured to monitor a state of a target facility, the method comprising:
an acquisition step of acquiring observation data on the basis of an output of a sensor provided in the target facility;
a state change detection step of, under an assumption that a prior distribution corresponding to a probability distribution that values of the observation data follow is preset and a run length that is a length for which the same state continues in the target facility follows a predetermined probability distribution, when observation data at a current time point is acquired in the acquisition step, obtaining a data occurrence probability that is a conditional probability at which an observation data value at the current time point is acquired when a parameter value is set as a condition on the basis of the observation data value at the current time point and a parameter value of the prior distribution, obtaining a run length probability distribution that is a distribution of a conditional probability of a run length when time-series observation data acquired up to the current time point is set as a condition on the basis of the data occurrence probability, and detecting a change in the state of the target facility on the basis of the run length probability distribution;
an update step of updating the parameter value using the observation data value at the current time point and generating a prior distribution to be used for calculating a data occurrence probability at the next time; and
an information presentation step of presenting information representing the change in the state of the target facility on the basis of a result in the state change detection step,
wherein, in the state change detection step, when it is determined that the current time point is a change point in the state of the target facility, a change indication point that is a time at which an indication of the change in the state of the target facility first appeared on the basis of the run length probability distribution is additionally searched for.

20. A non-transitory computer-readable recording medium, storing a program causing a computer to function as:
a data acquisition unit, configured to acquire observation data on the basis of an output of a sensor provided in the target facility;
a state change detection unit, configured to, under an assumption that a prior distribution corresponding to a probability distribution that values of the observation data follow is preset and a run length that is a length for which the same state continues in the target facility follows a predetermined probability distribution, when observation data at a current time point is acquired by the data acquisition unit, obtain a data occurrence probability that is a conditional probability at which an observation data value at the current time point is acquired when a parameter value is set as a condition on the basis of the observation data value at the current time point and a parameter value of the prior distribution, obtain a run length probability distribution that is a distribution of a conditional probability of a run length when time-series observation data acquired up to the current time point is set as a condition on the basis of the data occurrence probability, and detect a change in the state of the target facility on the basis of the run length probability distribution;

an update unit, configured to update the parameter value using the observation data value at the current time point and generate a prior distribution to be used for calculating a data occurrence probability at the next time; and an information presentation unit, configured to present information representing the change in the state of the target facility on the basis of a result of the state change detection unit, wherein, when it is determined that the current time point is a change point in the state of the target facility, the state change detection unit additionally searches for a change indication point that is a time at which an indication of the change in the state of the target facility first appeared on the basis of the run length probability distribution.

* * * * *